United States Patent [19]

Dumaine

[11] 4,024,842
[45] May 24, 1977

[54] ROTARY ENGINES

[76] Inventor: Fernand Dumaine, 1 Boulevard National, 13001 Marseille, France

[22] Filed: May 27, 1975

[21] Appl. No.: 580,760

[30] Foreign Application Priority Data

May 30, 1974 France .............................. 74.19460

[52] U.S. Cl. .............................. 123/8.45; 123/8.13; 123/8.11; 123/8.09
[51] Int. Cl.² ......................................... F02B 55/14
[58] Field of Search ............... 123/8.45, 8.09, 8.11, 123/8.13; 418/61 A

[56] References Cited

UNITED STATES PATENTS

| 2,362,705 | 11/1944 | Macartney et al. | 123/8.09 |
| 3,319,610 | 5/1967 | Hejj et al. | 123/8.09 |
| 3,405,695 | 10/1968 | Jones et al. | 123/8.45 |
| 3,584,607 | 6/1971 | Yamamoto | 123/8.45 |
| 3,606,602 | 9/1971 | Hamada et al. | 123/8.11 |
| 3,692,001 | 9/1972 | Hejj | 123/8.09 |
| 3,703,885 | 11/1972 | Feller | 123/8.11 |
| 3,929,106 | 12/1975 | Scott | 123/8.11 |

FOREIGN PATENTS OR APPLICATIONS

| 319,746 | 1926 | France | 415/92 |
| 1,451,721 | 7/1969 | Germany | 123/8.13 |
| 1,927,840 | 12/1969 | Germany | 123/8.13 |

OTHER PUBLICATIONS

The 2-Stage Rotary Engine – A New Concept in Diesel Power, by F. Feller, dated 10/23/70.

Primary Examiner—Clarence R. Gordon
Attorney, Agent, or Firm—William Anthony Drucker

[57] ABSTRACT

The present invention provides a rotary internal combustion engine comprising a stator, and a rotor journalled for rotation in said stator, said stator considered in a plane normal to its axis of rotation having a cross-section which is approximately an equilateral triangle with curvilinear sides, each side of said rotor having its external peripheral surface defining with the internal periphery of said stator a respective combustion chamber, the external peripheral surface of each side of said rotor including considered in the direction of rotation of said rotor an upstream surface portion having a relatively great radial component so as to receive maximum rotary thrust from the expanding combustion gases, an intermediate surface portion which is curvilinear and which extends from said upstream surface portion so as with said upstream surface portion to define relative to the internal periphery of the stator a part of the combustion chamber and receive less thrust than said upstream portion, and a downstream surface portion which extends from said intermediate portion to the radially outer end of the next succeeding upstream portion.

1 Claim, 8 Drawing Figures

ROTARY ENGINES

The subject of the invention concerns improvements made to rotary engines.

It is designed to be applied both to explosion engines and to two- or four-stroke combustion engines with or without ignition.

In known devices, rotary engines comprise, on the one hand, a fixed stator forming a housing whose inside surface is epitrochoidal in section, and on the other hand, a rotary piston the shape of which is a curvilinear equilateral triangle. Each rotor tip brushes the epitrochoidal curve, and its three surfaces move away from and towards this curve due to the eccentricity of the axis of rotation in such a way as to form three chambers of varying volume.

A cavity is drilled in the centre of each surface, which constitutes the main volume of the explosion chamber. As a result of its position when the explosion occurs, the expansion of the gases produces kinetic energy whose component is perpendicular to the direction of motion of the rotor, which from a power generating point of view gives very low output. The result is that, driven by kinetic energy, the rotor does nevertheless pass the dead-centre, but the expansion only imparts an imperfect thrust to it over an oblique deflecting surface which accelerates the expulsion of the gases towards the exhaust, which is what explains the poor output of these engines, especially when slowrunning. To this is added an absence of turbulence to mix the combustive gases.

The device in accordance with the invention eliminates these disadvantages and makes it possible to recover the kinetic energy of the explosion, to direct and deflect the expansion gases in the direction of rotation of the rotor, and to improve turbulence, facilitating mixing of the combustive stream, which reduces pollution.

It consists of creating functional profiles on the rotor surfaces, altering their curvilinear shape which provides no grip for the kinetic energy of the explosion, and replacing them by one or several thrust surfaces, perpendicular or slightly oblique according to the application, retaining or not retaining the cavity forming an explosion chamber and tracing cavities channelling the exhausts after having retained their propulsive force.

On the attached drawings, given as a non-limiting example of one of the forms of embodiment of the subject of the invention:

Figure 1:
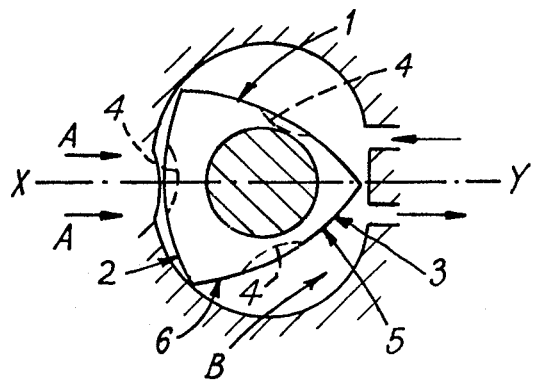
FIG. 1 shows, for comparative purposes, the profile of the sufaces of the rotor in known devices.
Figure 2:
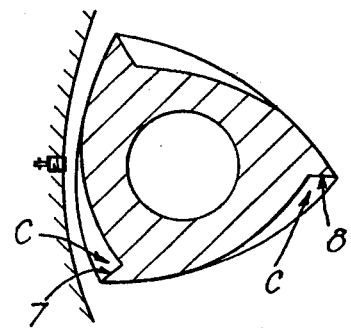
FIGS. 2 and 3 show, in longitudinal section, the functional profiles of the rotor surfaces.
Figure 3:
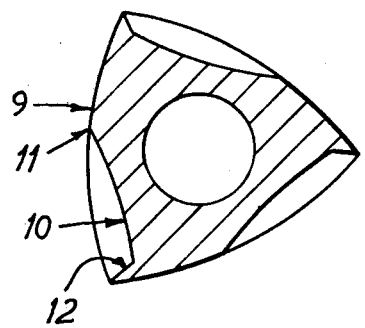

The known rotor comprises three curvilinear surfaces 1, 2, 3 with an axial explosion chamber 4. When the explosion occurs, the perpendicular forces A produce their thrust into the axis XY which has no resultant, so that the kinetic energy of the rotor is needed to pass this dead-centre. Moreover, as soon as this dead-centre is passed, the thrust of the gases is produced on the curvilinear sectors 5, 6 arrow B which facilitate the explosion but hold no kinetic energy.

The device in accordance with the invention, FIGS. 2 to 6, not only provides turbulence on intake, compression and explosion, but also makes it possible to present thrust surfaces 7, 8 arrows C making it easier to pass the dead-centre and transmitting the maximum thrust to the rotor up to the exhaust.

These profiles can form two cavities 9, 10 separated by a profile 11 constituting both an aerodynamic accelerator and a reduced thrust surface, while the perpendicular surface 12 constitutes a maximum thrust surface, recovering almost all the kinetic energy of the explosion, expansion up to exhaust.

Figure 4:
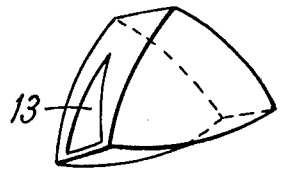
FIGS. 4, 5, 6 show, seen from the front and in elevation, the profiles extending the explosion chamber.
Figure 5:
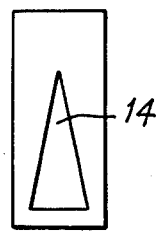
Figure 6:
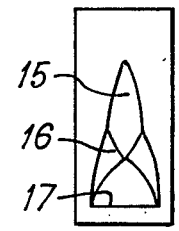

These profiles can be triangular in section 13,14 FIGS. 4, 5, or consist of curvilinear pieces 15, 16, 17, FIG. 6.

Figure 7:
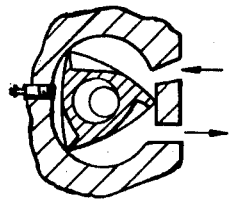
FIGS. 7, 8 show the explosion, expansion and exhaust strokes.
Figure 8:
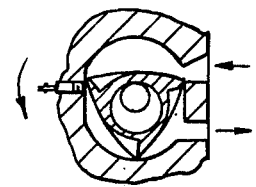

The explosion expansion strokes 18, 19 FIGS. 7, 8 are thus perfectly balanced, so that passing the dead-centre is cancelled by the kinetic energy of the rotor, and the thrust lines of the gases, which improves the output at low speeds.

It is possible to position the intakes and outlets laterally, and to modify the depth of the thrust profiles and their length.

This is why the shapes, dimensions and arrangement of the different components may vary within the limit of the equivalents, as may the materials used to manufacture them, without thereby altering the general concept of the invention which has just been described.

I claim:

1. A rotary internal combustion engine comprising a stator housing, a driving shaft journalled for rotation in said stator housing, an eccentric mounted on said driving shaft and positioned in said stator housing, and a rotor carried by said eccentric for rotation in said housing, said rotor considered in a plane normal to the axis of rotation of the driving shaft having a cross-section which is approximately an equilateral triangle with curvilinear side, each side of said rotor having its external peripheral surface defining with the internal periphery of the stator housing a respective combustion chamber, each side surface of the rotor having a recess which extends radially from said surface, said recess being approximately the shape of an isosceles triangle and having its base at the leading end and its apex at the trailing end when considered in the direction of rotation of the rotor, said recess being bounded by:
   i. a leading end face, at the base end of the recess, which is substantially normal to the peripheral side surface of the rotor for receiving maximum thrust from combustion gases circulating angularly in the stator housing, and
   ii. a trailing face extending circumferentially from the radially-inner edge of said leading face to merge with said side surface of the rotor, said trailing face including a first intermediate face portion extending from said leading face, and a second end face portion extending from said intermediate portion, said first and second face portions being shaped in relation to the internal surface of the stator housing so as to constitute an aerodynamic accelerator providing turbulence during the intake and explosion strokes.

* * * * *